United States Patent
Vukovich et al.

(10) Patent No.: US 6,909,955 B2
(45) Date of Patent: Jun. 21, 2005

(54) METHOD OF CONTROLLING A DUAL CLUTCH TRANSMISSION

(75) Inventors: William Vukovich, White Lake, MI (US); Melissa Koenig, Howell, MI (US); Artur Wirch, Speyer (DE)

(73) Assignee: BorgWarner, Inc., Auburn Hills, MI (US)

( * ) Notice: Subject to any disclaimer, the term of this patent is extended or adjusted under 35 U.S.C. 154(b) by 19 days.

(21) Appl. No.: 10/723,576

(22) Filed: Nov. 26, 2003

(65) Prior Publication Data

US 2004/0172184 A1 Sep. 2, 2004

Related U.S. Application Data

(63) Continuation-in-part of application No. 10/371,381, filed on Feb. 21, 2003, now Pat. No. 6,832,978.

(51) Int. Cl.[7] .................. B60K 17/00; B60K 20/00; B60K 41/22
(52) U.S. Cl. ................ 701/51; 701/54; 477/120
(58) Field of Search ............................ 701/51, 55, 54, 701/64, 66; 477/120, 154, 155, 143, 109, 68, 121, 125, 124, 80; 74/335, 336 R, 473.1; 475/76, 80

(56) References Cited

U.S. PATENT DOCUMENTS

| | | | |
|---|---|---|---|
| 3,589,483 A | 6/1971 | Smith | 192/3.52 |
| 4,461,188 A | 7/1984 | Fisher | 74/330 |
| 4,513,631 A | 4/1985 | Koivunen | 74/360 |
| 4,544,057 A | 10/1985 | Webster et al. | 192/0.076 |
| 4,627,312 A * | 12/1986 | Fujieda et al. | 477/124 |
| 4,827,784 A | 5/1989 | Muller et al. | 74/330 |
| 5,444,623 A * | 8/1995 | Genise | 701/52 |
| 5,522,775 A * | 6/1996 | Maruyama et al. | 475/76 |
| 5,662,198 A | 9/1997 | Kojima et al. | 192/87.11 |
| 5,711,409 A | 1/1998 | Murata | 192/87.11 |
| 5,720,203 A | 2/1998 | Honda et al. | 74/325 |
| 5,890,392 A | 4/1999 | Ludanek et al. | 74/331 |
| 5,915,512 A | 6/1999 | Adamis et al. | 192/3.61 |
| 5,950,781 A | 9/1999 | Adamis et al. | 192/3.61 |
| 5,966,989 A | 10/1999 | Reed, Jr. et al. | 74/331 |
| 5,979,257 A | 11/1999 | Lawrie | 74/335 |
| 6,006,620 A | 12/1999 | Lawrie et al. | 74/335 |
| 6,012,561 A | 1/2000 | Reed, Jr. et al. | 192/48.2 |
| 6,044,719 A | 4/2000 | Reed, Jr. et al. | 74/330 |
| 6,145,398 A | 11/2000 | Bansbach et al. | 74/335 |
| 6,269,293 B1 * | 7/2001 | Correa et al. | 701/51 |
| 6,286,381 B1 | 9/2001 | Reed, Jr. et al. | 74/336 |
| 6,364,809 B1 | 4/2002 | Cherry | 477/86 |
| 6,435,049 B1 * | 8/2002 | Janasek et al. | 74/335 |

FOREIGN PATENT DOCUMENTS

GB 2 036 203 A 11/1980

* cited by examiner

Primary Examiner—Thomas G. Black
Assistant Examiner—Dalena Tran
(74) Attorney, Agent, or Firm—Bliss McGlynn, P.C.; Greg Dziegielewski

(57) ABSTRACT

A method of controlling the timing of the shift events of a dual clutch transmission that includes the steps of sensing the current output speed of the transmission, determining the time required to complete each possible shift event within the transmission, and determining an output speed modification value for each possible shift event. The method also includes the steps of determining a modified shift point output speed for each possible shift event by summing the determined output speed modification value with a predetermined shift pattern output speed, and commanding the shift when the current output speed reaches the determined modified shift point output speed.

20 Claims, 5 Drawing Sheets

METHOD OF CONTROLLING A DUAL CLUTCH TRANSMISSION

CROSS-REFERENCE TO RELATED APPLICATIONS

This application is a continuation-in-part of U.S. Ser. No. 10/371,381, entitled Method Of Controlling A Dual Clutch Transmission filed Feb. 21, 2003 now U.S. Pat. No. 6,832,978.

BACKGROUND OF THE INVENTION

1. Field of the Invention

The present invention relates, generally to a method of controlling a dual clutch transmission and, more specifically, to a method for controlling the timing of the gearshift events of the dual clutch transmission by determining the optimum shift points based on vehicle acceleration or load.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first and oldest type is the manually operated transmission. These transmissions include a foot-operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever, and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 04, 2000 to Reed, Jr. et al for an Electro-mechanical Automatic Transmission having Dual Input Shafts. These particular types of automated manual transmissions have two clutches and are generally referred to simply as dual, or twin, clutch transmissions. The dual clutch structure is most often coaxially and cooperatively configured so as to derive power input from a single engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electromechanical type, since a lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released, and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions overcome several drawbacks associated with conventional transmissions and the newer automated manual transmissions, it has been found that controlling and regulating the automatically actuated dual clutch transmissions is a complicated matter and that the desired vehicle occupant comfort goals have not been achievable in the past. There are a large number of events to properly time and execute within the transmission for each shift to occur smoothly and efficiently. Conventional control schemes and methods have generally failed to provide this capability. Accordingly, there exists a need in the related art for better methods of controlling the operation of dual clutch transmissions.

One particular area of control improvement that is needed is in the timing of the events in the power-shifting of the dual clutch transmission. As discussed above, power shifting is actually the automatic gear shifting process of the dual clutch transmission. The nature of the dual clutch transmission, that is, the manual style configuration discussed above that employs automatically actuated disc type clutches, requires accurate control of the clutch engagement and thus the torque transferred across them during the gear shifting process. Additionally, the movement of the synchronizers requires accurate control in the gear-shifting event. It is desirable to operate the synchronizers and the clutches of the dual clutch transmission so that the automatic gear shifting process is smoothly and efficiently controlled by varying the amount of torque transferred across each clutch as the clutch torque driving the off-going gear is minimized and the clutch torque driving the on-coming clutch is maximized. The efficiency and smooth operation of the shifting event is directly related to the control and timing of each portion of the shift. More specifically, it is critical to control the timing of the shift in relation to the demand for vehicle acceleration and for variations in vehicle load caused by road and driving conditions.

Current control methods have the general capability to operate the clutches and synchronizers as needed. However, the prior art dual transmission clutch control schemes are incapable of adequately providing for the fine timing and control of the shift event necessary to satisfy this need. Specifically, they lack the ability to accurately control when the shift occurs to achieve the high degree of accuracy needed for peak fuel efficiency and driveability in shifting between the gears of the transmission under all vehicle loading conditions and throttle demands. For example, when rapid acceleration is called for, with low or light load conditions on the vehicle, engine inefficiency and even damage may occur if the shift timing is not adjusted to occur sooner as a means for compensating for the rapid acceleration when compared to the shift timing of a more leisurely acceleration. In other words, if the timing of the shift is not adjusted to account for the rapid increase in engine speed such that the shift event is held to a slower shifting pace, the engine will likely overspeed. Likewise, if rapid acceleration is called for but the load on the vehicle is heavier, such as when the vehicle encounters a steep road incline, the resultant vehicle acceleration will be slower. In this case, the shift should occur later to coincide increasing load to prevent a premature gearshift. Downshifting events also require timing control depending on the deceleration demands and vehicle loading to provide smooth and efficient control of the transmission and engine. Current control methods for shifting a dual clutch transmission generally concern themselves with simple engagement and disengagement of the clutch assemblies and synchronizers and fail to adequately provide for the corresponding timing control of all aspects of the shift event including engine speed control during the shift and the differences in upshifting and downshifting.

In that regard, some prior control methods for the gear shifting of dual clutch transmissions have attempted to overcome these inadequacies by using a control algorithm. For example, one known method provides an algorithm to control the movement of electrical clutch actuators, and thus the engagement of the clutches, to prevent torque interruption during upshifts of a dual clutch transmission. While the application of this particular algorithm is functionally adequate for its intended use, it still has certain drawbacks that leave room for improvement.

Particularly, while this and other known dual clutch transmission shifting approaches attempt to provide a power-shift in which there is no interruption of torque transfer, none of the current methods provides for variable shift points and variable engine speed profiles for smooth and efficient torque transfer under varying conditions. Additionally, certain prior art methods utilize an engine performance map that attempts to predict expected engine output torque and sets the clutch position and shift points based on those predictions so that this control method is reactive to predicted engine output. The drawback of this control approach is that the values of the considered variables can fluctuate greatly and a stored map of predictions cannot be adequately relied upon to predict the actual engine output. Accordingly, there remains a need in the art for a method to operatively and actively control the timing of the gearshifts in a dual clutch transmission by varying the shift points so that both upshifts and downshifts are efficiently and smoothly performed and optimum engine efficiency and safe operation is maintained.

SUMMARY OF THE INVENTION

The disadvantages of the related art are overcome by the method of the present invention for providing the timing control of the shift events for a vehicle having a dual clutch transmission. The method of the present invention includes the steps of sensing the current output speed of the transmission, determining the time required to complete each possible shift event within the transmission, and determining an output speed modification value for each possible shift event. The method also includes the steps of determining a modified shift point output speed for each possible shift event by summing the determined output speed modification value with a predetermined shift pattern output speed, and commanding the shift when the current output speed reaches the determined modified shift point output speed.

Thus, the method of the present invention controls the timing of the shift events of the dual clutch transmission by controlling the shift points in response to changes in the load and commands for acceleration. This is a substantial efficiently improvement over the prior methods of dual clutch shift control, which do not consider all the various conditions and situations in which a shift may occur. Furthermore, the shifts are accomplished at peak horsepower points to provide the optimum balance of fuel economy and driveability so that there is no hard or distinctive "feel" to the shift, thereby improving overall drivability and comfort of the vehicle.

Other objects, features, and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
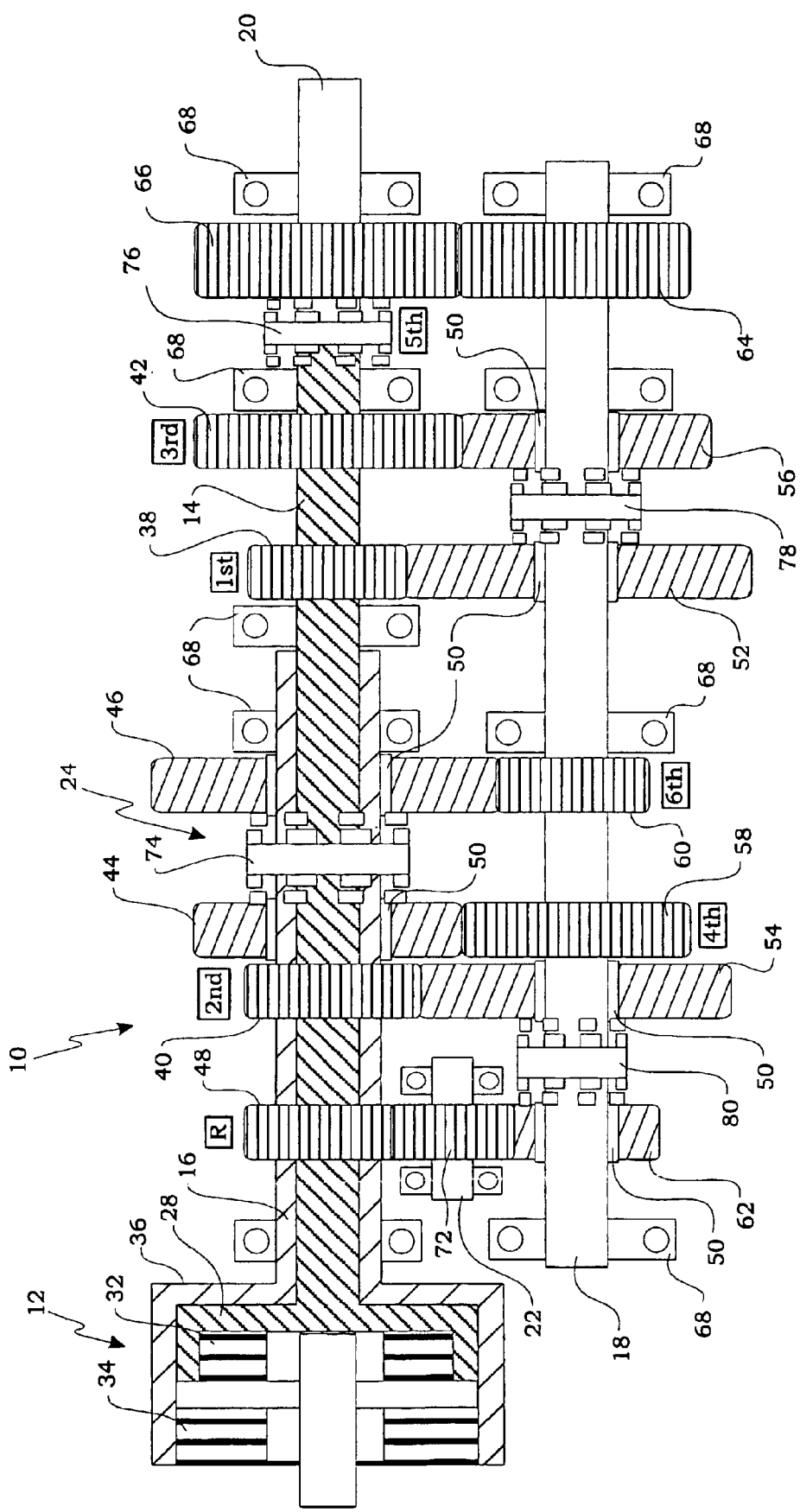
FIG. 1 is a generalized schematic illustration of a dual clutch transmission that may be controlled by the method of the present invention.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, and a plurality of synchronizers, generally indicated at 24.

The dual clutch transmission 10 forms a portion of a vehicle powertrain and is responsible for taking a torque input from a prime mover, such as an internal combustion engine and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacting with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators (not shown) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly disposed on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

In the preferred embodiment, the counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly retained on the output shaft 20. The output shaft 20 extends outward from the transmission 10 to provide an attachment for the remainder of the powertrain.

In the preferred embodiment, the reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gear 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that they are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its shaft when moved off of a center neutralized position to the right and engage another gear to its shaft when moved to the left.

It should be appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch engagement functions. Thus, the control method of the present invention that controls the timing of the shift events as described below is a portion, such as a sub-routine, or series of sub-routines, of a larger control scheme within the ECU.

The first and second clutch mechanisms 32 and 34 of the dual, coaxial clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as seen in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. Additionally, while engaged and driving a particular gear, the first and second clutch mechanisms 32 and 34 are controlled by certain stored routines that provide varying amounts of engagement force to the clutch discs and thereby operatively control the amount of torque transferred across the clutches and the resultant engine speed. Of particular concern to this application is the speed control routine that causes the engine speed to track a predetermined target speed for given input parameters by varying the applied engagement pressure across the clutch discs. In that regard, the actuating components of the first and second clutch mechanisms 32 and 34 are not shown and it should be appreciated there may be of any number of suitable known devices that are capable of selectively varying the applied engagement pressure between the clutch discs, such as, but not limited to mechanical actuators, hydro-mechanical actuators, electromechanical actuators, or fully electrical actuators.

For example, in one embodiment of the dual clutch transmission 10, the first and second clutch mechanisms 32 and 34 of the dual, coaxial clutch assembly 12 are actuated by hydraulic pressure supplied by the first and second clutch actuator solenoids, respectively. The clutch actuator solenoids are schematically represented, and generally indicated at 120 and 122 in FIG. 2, and as shown, are supplied with pressurized hydraulic fluid by a regulating circuit generally indicated at 82. It should be appreciated that, as previously mentioned, the actuation of the components of the dual clutch transmission 10 may be electrical rather than electro-hydraulic, and in that case, the first and second clutch actuator solenoids 120, 122 would be replaced by some type of physical drive devices to operatively engage the first and second clutch mechanisms 32 and 34.

Figure 2:
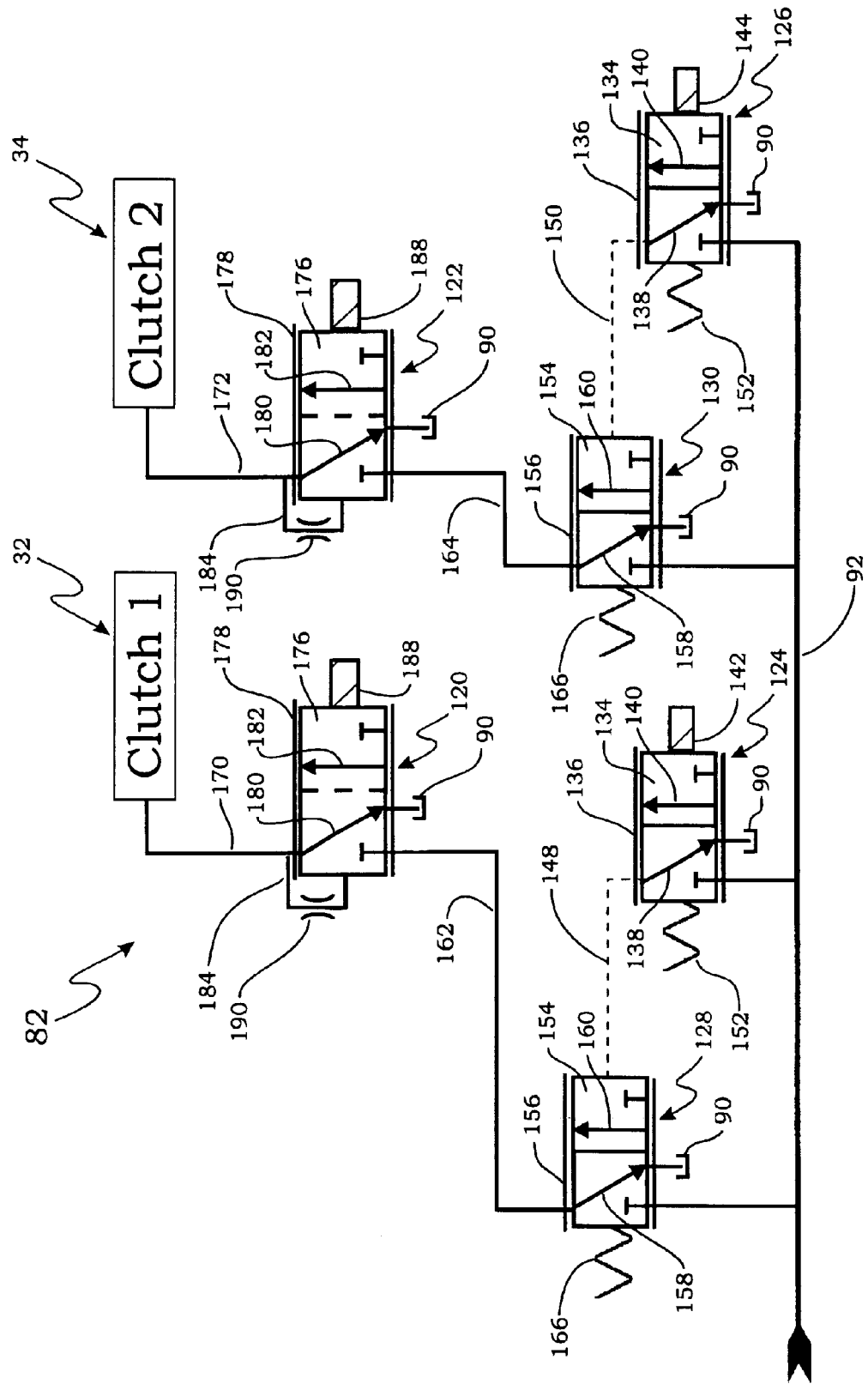
FIG. 2 is a schematic illustration of the electro-hydraulic control circuit for the clutch actuators of a dual clutch transmission that may be controlled by the method of the present invention.

As shown in FIG. 2, for this example of a dual clutch transmission 10, there are two on/off solenoids, generally indicated at 124 and 126, and two enable valves, generally indicated at 128 and 130 that provide the operative hydraulic pressure to the clutch actuator solenoids 120 and 122. A main pressure supply line 92 that is operatively connected to a source of pressurized hydraulic fluid from a pump within the transmission 10 (not shown) provides the two on/off solenoids 124 and 126 with pressurized hydraulic fluid. The on/off solenoids 124 and 126 each have a selectively movable valve member 134 disposed within a valve body 136 that has internal hydraulic flow passages 138 and 140. When energized, the valve members 134 of the on/off solenoids 124 and 126 are driven to the left, as illustrated, by actuators 142 and 144 respectively. The on/off solenoids 124 and 126 then selectively provide hydraulic pressure though pressure lines 148 and 150 to act upon the right sides of enable valves 128 and 130, as illustrated in FIG. 2. In their normally de-energized state, biasing member 152 causes the valve member 134 to be driven back to the right and any residual pressure in pressure lines 148 or 150 is bled off and routed back to the fluid sump, shown at 90.

The enable valves 128 and 130 also each have a selectively movable valve member 154 disposed within a valve body 156 that has internal hydraulic flow passages 158 and 160. The applied hydraulic pressure from the on/off solenoids 124 and 126 act to push the valve members 154 of the enable valves 128 and 130 to the left to open the internal hydraulic passage 158 and provide hydraulic pressure to clutch actuator solenoid 120 and 122 through the pressure supply lines 160 and 162. In their normally de-energized state biasing member 166 causes the valve member 154 to be driven back to the right and any residual pressure in pressure lines 160 or 162 is bled off and routed back to the fluid sump, shown at 90.

Though beyond the scope of this invention and not shown here, the two enable valves 128 and 130 are also in fluid communication with, and hydraulically feed, the synchronizer actuator solenoids that drive the synchronizers 24 of the transmission 10 between their engaged and neutralized positions. Thus, it should be appreciated that two on/off solenoids 124 and 126, and two enable valves 128 and 130 also have other hydraulic switching functions within the transmission 10, such that the on/off solenoids 124 and 126 are selectively operable to provide and remove hydraulic actuating pressure and prevent uncontrolled actuation of the mechanisms within the transmission 10.

When the on/off solenoids 124 and 126 are actuated and the enable valves 128 and 130 have charged the pressure supply lines 162 and 164 to the clutch actuator solenoids 120 and 122, the first and second clutch mechanisms, generally indicated at 32 and 34, are controllable. The clutch actuator solenoids 120 and 122 are in fluid communication with the clutch mechanisms 32 and 34 through clutch pressure lines 170 and 172 respectively. Each of the clutch actuator solenoids 120 and 122 have a selectively movable valve member 176 disposed within a valve body 178 that has internal hydraulic flow passages 180 and 182. The clutch actuator solenoids 120 and 122 also have external hydraulic feedback passages 184. A solenoid 188 selectively drives the valve member 176 operatively from its de-energized position biased to the left as illustrated in FIG. 2 to its energized position which allows the flow of pressurized hydraulic fluid to flow through internal passage 182 out the clutch pressure line 170, 172 to the clutch 32, 34.

The clutch actuator solenoids 120 and 122 are current controlled, variable regulating valves, such that a given control current applied to solenoids 188 will result in a particular pressure output in the clutch pressure lines 170, 172. Regulation of the clutch actuator solenoids 120, 122 is further provided by the pressure feedback through passages 184. Similar to the on/off solenoids 124 and 126 and the enable valves 128 and 130, the clutch actuator solenoids 120 and 122 have internal passages 180 to send residual pressure from the clutch pressure lines 170 and 172 back to the sump 90 when the solenoid is de-energized.

To control the larger scheme of the overall process of shifting gears in a dual clutch transmission, a higher level control method is necessary. That particular method is discussed in detail in the co-pending application. It controls the manner in which the torque is transferred across each of the two clutches of the dual clutch transmission during a gearshift and is briefly repeated here to clarify the method of the present invention. The higher level control method is generally indicated at 200 in FIG. 3, wherein the first of the two clutches is the off-going clutch and the second of the two clutches is the on-coming clutch. This gearshift method, as previously discussed, is stored in a control device such as an ECU and operatively controls the functions of the shifting process by controlling the torque transfer across the clutches 32 and 34 of the dual clutch transmission 10 for either a downshift or an upshift. The method begins at the start entry block 202 and includes the steps of determining when a shift has been commanded at process block 204, sensing the speed of the driven member of the off-going clutch at process block 206, determining the desired clutch torque/slip profile for the changeover of clutches during the shift at process block 208, and sensing the speed of the driven member of the on- coming clutch at process block 210.

The determination of the desired clutch torque/slip profile is based on the application of any one of a variety of torque/slip profiles, which may be maintained in a lookup table or otherwise stored in accessible memory within the ECU. These torque/slip profiles are predetermined and are mathematically expressed as the change in clutch torque and slip over time. Different profiles may be used in different situations and for different gear changes. The profiles are derived based on the generally shift "feel" that is desired. However, it has been determined that the most desirable clutch torque/slip profile for the dual clutch transmission is the one which provides a linear ramp up and ramp down of the respective clutches. The linear profile provides a smooth and efficient transition from the off-going clutch to the on-coming clutch.

Figure 3:
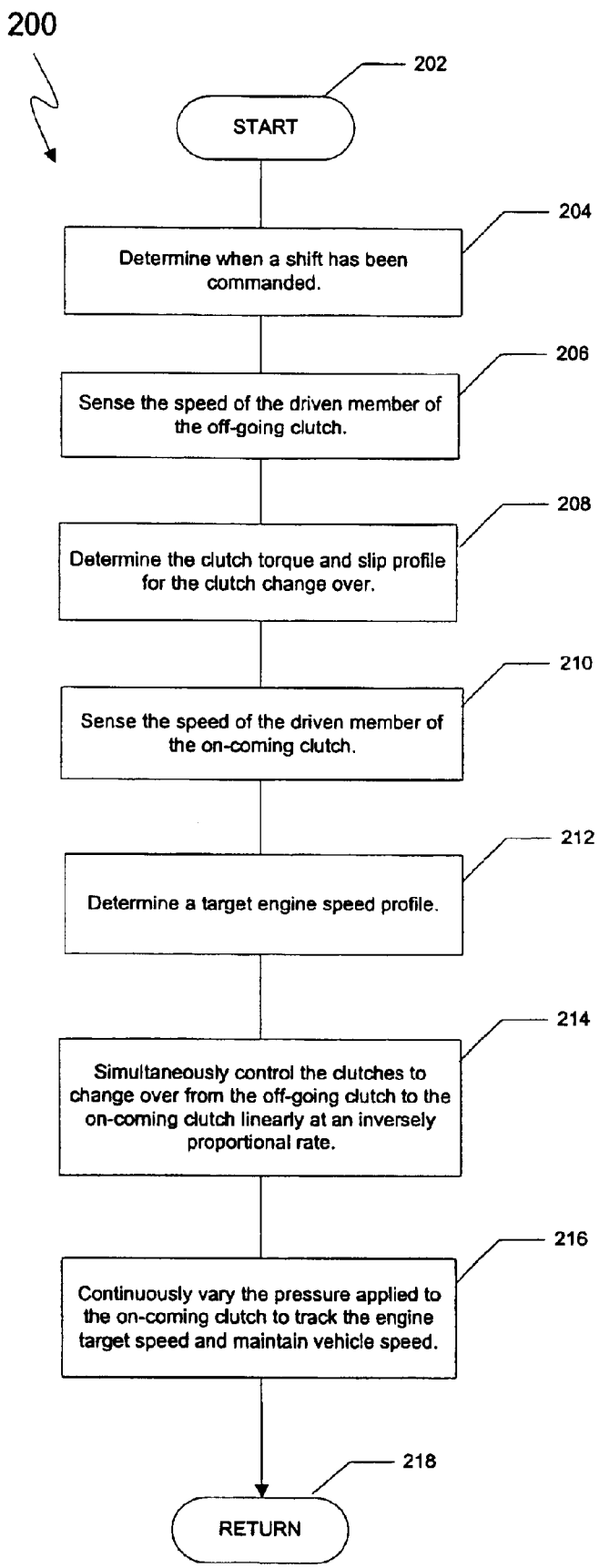
FIG. 3 is a block diagram flowchart of a higher level control method for controlling a dual clutch transmission during a shift event.

A target engine speed profile is then determined at process block 212 based on the off-going clutch speed, the clutch torque/slip profile, and the on-coming clutch speed. The method then simultaneously controls the torque transfer across each clutch so that the torque output of the transmission will be changed over from the off-going clutch to the on-coming clutch by linearly decreasing the torque transferred across the off-going clutch while linearly increasing the torque transferred across the on-coming clutch in an inversely proportional rate to follow the clutch torque and slip profile (process block 208) and cause the engine to track the target engine speed profile at process block 214. In other words, the total torque for the clutch changeover is determined and as each clutch is controlled independently, the total torque is linearly apportioned between each clutch during the changeover. Then at process block 216, the method varies the pressure applied to the on-coming clutch, once the on-coming clutch is transferring all of the output torque, to cause the engine to continue to track the target engine speed profile so that vehicle speed is maintained More specifically, if the transmission is performing an upshift operation in response to an engine throttle position that is causing positive torque to occur, then the vehicle is accelerating or in a positively driven steady state. Positive torque is generated when the engine is providing power, and thus torque, to the transmission and drive train. Therefore, maintaining vehicle speed in this sense actually means maintaining the same rate of acceleration during the upshift so that the gear change is not felt by the occupant of the vehicle. Likewise, if a downshift is being performed in response to a lowered engine throttle position causing negative torque to occur, then the vehicle is decelerating. Negative torque is generated when the vehicle is slowing such that the vehicle's inertia, as delivered through the transmission, exceeds the torque provided by the engine so that the transmission is attempting to drive the engine. Maintaining vehicle speed in this sense actually means maintaining the same rate of deceleration during the downshift so that the gear change is not felt by the occupant of the vehicle. These two shifting situations are the ones that occur most commonly. In the first situation, the vehicle is accelerating (positive torque) and the transmission is upshifting through the gears in response. In the second situation, the engine throttle is reduced and the vehicle is decelerating (negative torque) so that the transmission would be downshifting in response. Referring to FIG. 3, when the shift is completed and either the vehicle acceleration or deceleration is maintained at process step 216, then the method of the present invention exits at step 218.

When discussing a target engine speed profile that is used to control the engagement of the clutches to regulate the speed of the engine, and thus the vehicle during the shift, the term "target engine speed" and its associated concepts may take on a number of connotations in common practice and the terminology used here should be clearly understood. In general use, the phrase "target engine speed" may be used in an "engine speed control" scheme or strategy. The term "engine speed control" as used herein means holding the engine to a specific speed (RPM), or limiting the engine to a specific speed, or controlling the engine speed (and thus, its acceleration) over its operating range. Thus, engine speed control using a target engine speed may use a target that is either a static point, or involve dynamic control. In this case, during the shift activity of the transmission, the method of the present invention provides target engine speeds that are in actuality constantly changing, or dynamic. Target engine speed profiles are based on the clutch speeds and the desired slip across the clutches. Thus, the engine speed is caused to track the target engine speed profile by the control of the torque transfer across the clutches of the dual clutch transmission.

It should also be appreciated that in addition to the dynamic target engine profile, there is also a predetermined shift pattern output speed for each gear change. For any particular gear change (first to second, or fifth to fourth, for example) the shift pattern output speed is the desired predetermined peak engine output speed at which the engine should shift to achieve the best mix of fuel economy and horsepower output. In other words, to optimize power and fuel efficiency, there is a predetermined maximum (or minimum if downshifting) engine output speed that should occur within the particular target engine output speed profile (i.e. shift pattern). Thus, as will be discussed below, even though the target engine speed profile is dynamic, the method of the present invention causes the transmission to shift at the shift pattern output speed. The shift pattern output speed is a set value for each gear change (up or down) and they are stored as a reference in a lookup table or database.

As previously mentioned, there are two general conditions of torque transfer across an engaged clutch that involve either positive or negative torque. Positive torque exists where the engine is providing power to the remainder of the drive train and negative torque exists where the inertia of the vehicle is providing greater energy to the drivetrain than the engine so that the transmission is attempting to drive the engine. It should be appreciated that a neutral torque condition may also exist where neither the engine nor the vehicle drivetrain are imparting a transfer of torque to one another.

In the course of vehicle operation, the transmission will be called upon to upshift or downshift when either positive or negative torque is occurring. Thus, four particular shifting situations exist. In addition to the two shifting situations mentioned above (positive torque upshift and negative torque downshift), a positive torque downshift and a negative torque upshift may also be encountered. Generally speaking, a positive torque downshift will most likely occur in a vehicle "accelerate to pass" condition. This is where the engine throttle position is set to cause the engine and vehicle to accelerate or maintain a speed but it is desirable to rapidly accelerate to pass another vehicle. In this case, the engine throttle position will be maximized causing a commanded downshift to the next lower gear in an attempt to immediately increase the engine speed to place it in a higher torque generating RPM range.

The negative torque upshift most often occurs when the vehicle is traveling downhill and the engine throttle position is reduced so that the vehicle is coasting and its inertia exceeds the engine torque output. In this case, the negative torque from the drive train and transmission is driving the engine causing it to increase in speed. In some situations this is effectively "engine braking" and may be a desired effect. However, if the braking effect becomes excessive so that the engine is driven undesirably high into its RPM range an upshift may be commanded, which will cause the transmission to shift into the next higher gear so that the engine is driven at a lesser speed. It should be appreciated that the conditions described above concerning the necessity for any particular shifting situation within the dual clutch transmission are used in an illustrative manner and other conditions may also exist that would precipitate like responses from the transmission.

Although each of the four shifting situations differ in the required steps necessary to control and execute the particular gearshift event, each commonly requires the determination of a target engine speed profile. More specifically, the target engine speed profile for each gearshift situation consists of a first and second profile portion as defined by first and second time periods. In the case of positive torque upshifts and negative torque downshifts, the first time period and first target engine speed profile occur as the torque transferred across the on-coming and off-going clutches are linearly and proportionally changed over. Then, the second time period and second target engine speed profile allow the engine and the next selected gear to continue to smoothly and efficiently operate the vehicle in the same manner before the shift (i.e. accelerating or decelerating, respectively). In a reversed but similar manner, the first time period and first target engine speed profile of the positive torque downshifts and negative torque upshifts allow the engine speed to control the desired operation of the vehicle (i.e. accelerating or decelerating, respectively) before the clutch changeover occurs during the second time period under the second target engine speed profile. It should be appreciated that there are a number of separate and distinct method steps required to control the gearshifts in each of the four particular shifting situations mentioned above. The particular method steps are discussed in greater detail in the co-pending application having U.S. Ser. No. 10/371,381 and will not be repeated here except for general references to a positive torque upshifting event to assist in illustrating the present invention.

Figure 4:
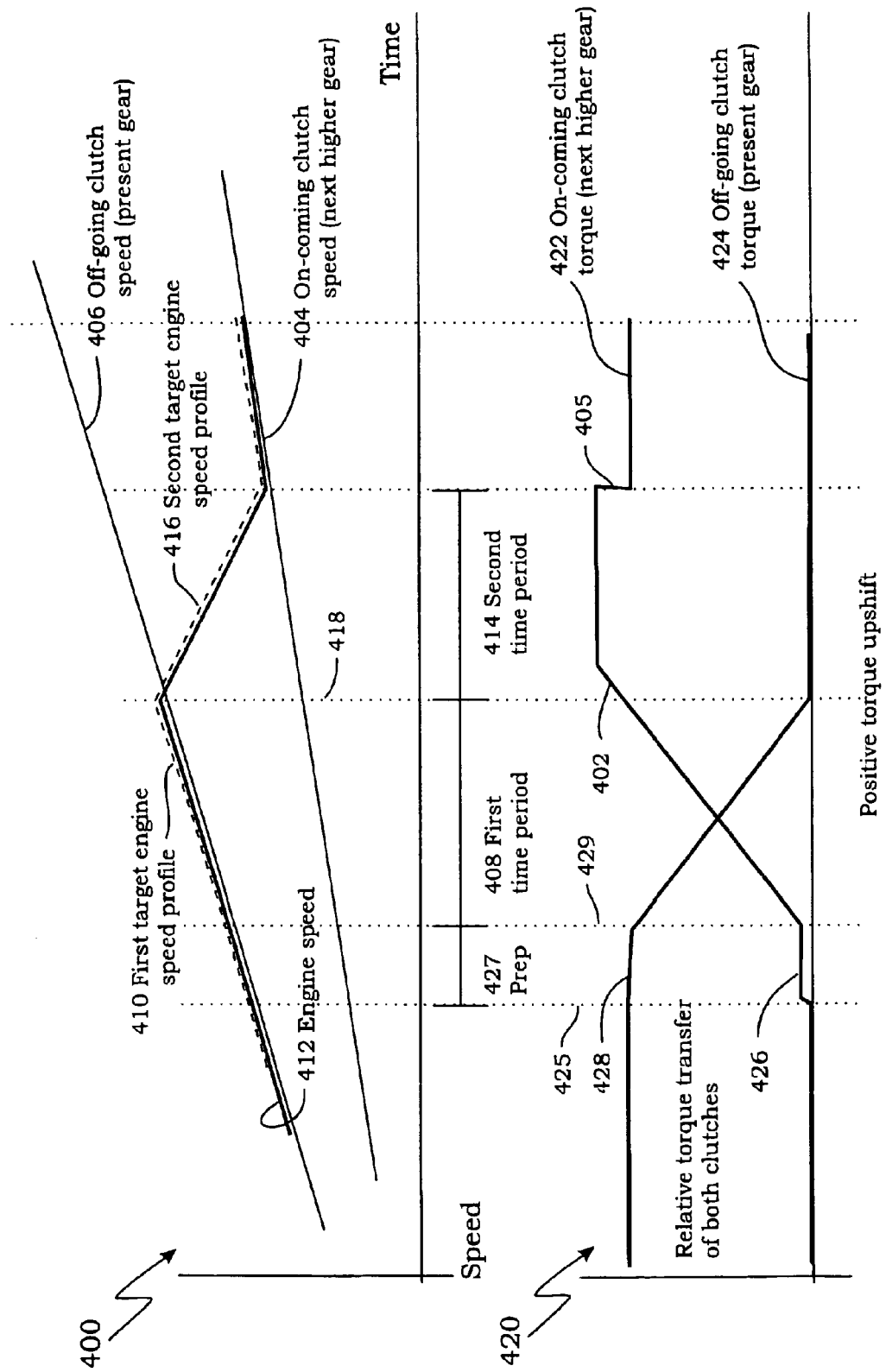
FIG. 4 is a representative graph of a higher level control method controlling the engine speed and clutch torque transfer over time during a positive torque upshift event for a dual clutch transmission.

In particular, the control of the torque transfer across the two clutches of the dual clutch transmission during a positive torque upshift event is graphically illustrated in FIG. 4. A graph of the relative speeds of the two clutches versus a relative time line is generally indicated at 400 and a graph of the relative level of torque transfer of the two clutches versus the same relative time scale is generally indicated at 420. In the positive torque upshift, as described above, the generally increasing speed of the on-coming clutch is shown as line 404 and the generally increasing but much higher relative increasing speed of the off-going clutch is shown as line 406. The positive torque upshift will cause the delivery of the output torque of the engine to be changed over from the clutch driving the lower gear to the clutch driving the higher gear. Therefore, as the first time period at 408 and the first target engine speed profile at 410 are determined, the engine speed 412 is caused to track the first target engine speed profile 410. This occurs as the simultaneous linear clutch change over takes place. This is illustrated by the change in the on-coming and off-going clutch torque lines 422 and 424 of 420 during the first time period 408. It should be appreciated that in determining the duration of the first time period 408, which ends at line 418, the shift pattern output speed is retrieved to reference the optimum shift point in terms of engine speed. However, as will be discussed below, the shift point will be modified based on specific load and acceleration conditions.

Referring to FIG. 4, a second time period at 414 and a second target engine speed profile at 416 are then determined, which causes the engine speed 412 to track the second target engine speed profile 416. The second target engine speed profile 416 and the subsequent change in engine speed is shown as decreasing due to an increase of the clutch pressure to draw the engine speed down to meet the rising speed of the on-coming clutch 404. The increased clutch pressure causes greater torque transfer, shown at 402, so that as engine speed decreases the increased torque transfer continues to maintain the acceleration of the vehicle. Finally, a decrease in the clutch pressure of the now fully engaged on-coming clutch allows the engine and vehicle to continue the acceleration as the engine and clutch speed become equal. This is shown at 405 where the control of the on-coming clutch torque 422 exits the second time period 414.

Once a target engine speed profile for a particular shift event is determined by the higher level control method, the timing of the occurrences of physical stages of the shift become critical to ensure that the target engine speed will be tracked through both time periods and especially as the first time period ends and the second time period begins. This is true due to the fact that, although a profile has been determined, vehicle speed and engine acceleration effect how quickly the engine speed will change and respond to the torque transfer control of the clutches as executed by the higher level control method. Thus, given that there exists a predetermined shift pattern output speed at which the engine should shift for optimum efficiency the timing of the shift event must be modified to meet that shift pattern output speed. For example, in the case of a positive torque upshift under hard or rapid acceleration, the rapid acceleration must be compensated for by changing the timing of the shift event. If there is no timing compensation, when the rapidly accelerating engine speed reaches the desired shift point (shift pattern output speed) it will continue to accelerate beyond the desired target engine speed profile as the shift event is in progress and the engine speed will be uncontrolled in regard to the desired second target engine speed profile in the second time period. Thus, in a rapid acceleration positive torque upshift, the shift event, and thereby the shift point, must begin earlier than the shift pattern output speed to cause the engine speed to accurately track the target engine speed profile.

Aside from this example, the target engine speed profile determined by the higher level control method is most often generated for the particular shift event to provide the highest engine efficiency and smooth driving feel. It should be appreciated that there may also be particular applications in which the target engine speed profile may be generated for more performance output. Regardless, it is not only desirable to determine a compensation for the timing of the shift event to keep the engine speed from exceeding the shift pattern output speed and the target engine speed profile, it is particularly desirable to continuously re-determine the optimum shift point as the varying driving factors may rapidly change as the engine and transmission nears a shift point. In practice, it has been determined that the effects of vehicle acceleration and more specifically vehicle acceleration in terms of load placed on the engine by road conditions are critical factors in determining optimum shift point. Thus, the method of the present invention takes the reference of the shift pattern output speed and dynamically determines the modified shift point for each possible shift event, and then commands the shift when the current engine speed reaches that point.

It should be appreciated that the time line illustrated in FIG. 4 correlates with and is relative to the acceleration and the speed of the vehicle, such that the more rapid the acceleration, the more compressed the time line. This means that although the target engine profiles will have the same general shape to reach the shift pattern output speed at line 418, they will have greater or sharper slopes. Conversely, slower vehicle acceleration will expand the time line and the target engine speed profiles will have lesser and shallower slopes. This graphically illustrates the necessity for the method of the present invention, as the proper timing of the underlying shift events cause the resultant engine speed (412 in FIG. 4) to accurately track the target engine speed profiles determined by the higher level control method.

To control the timing of the shift events of a dual clutch transmission, the method of the present invention includes the steps of sensing the current output speed of the driven member of the transmission, determining the time required to complete each possible shift event within the transmission, and determining an output speed modification value for each possible shift event. The method then determines a modified shift point output speed for each possible shift event by summing the determined output speed modification value with a predetermined shift pattern output speed, and commands the shift when the current output speed reaches the determined modified shift point output speed.

Figure 5:
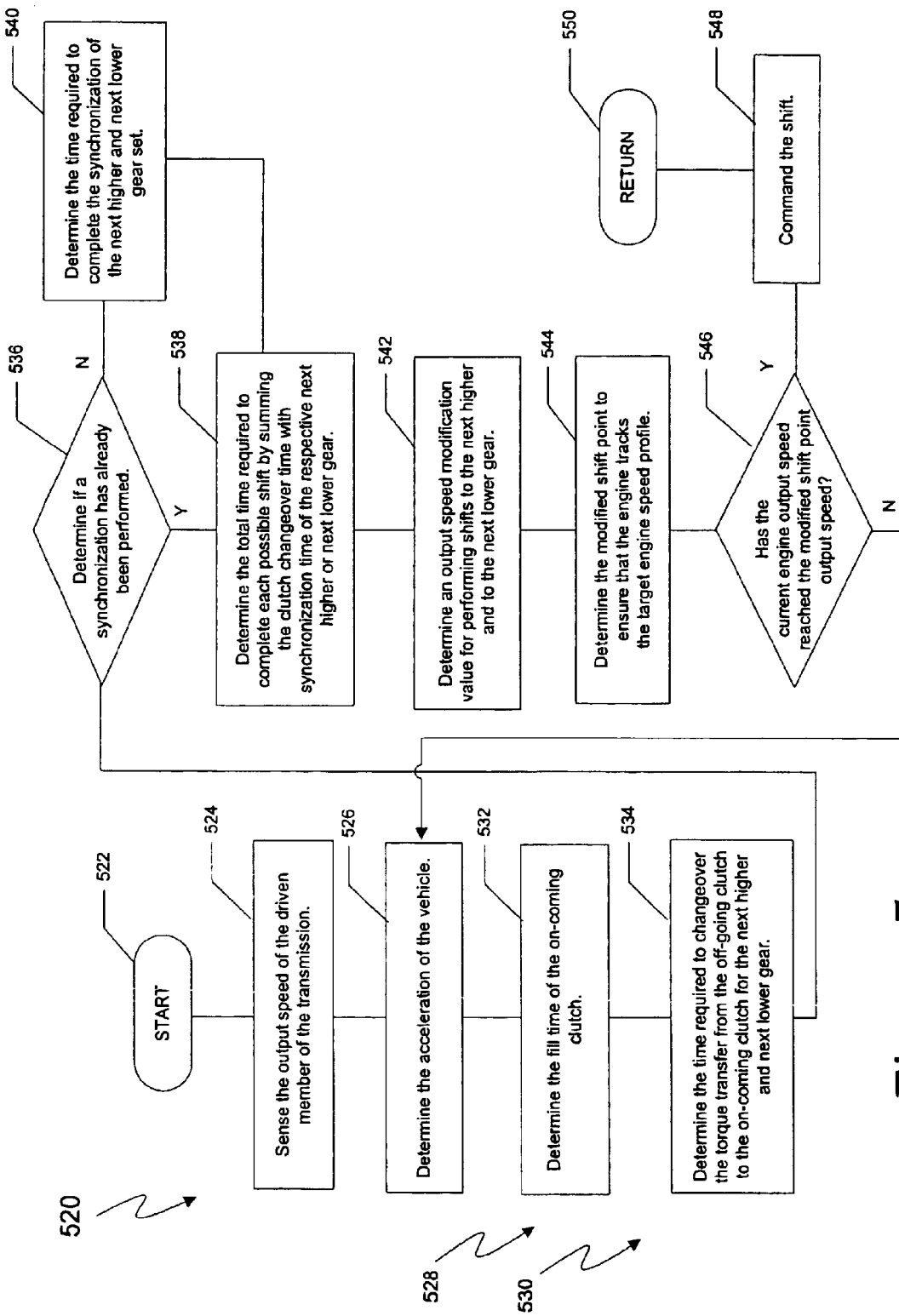
FIG. 5 is a block diagram flowchart of the method of the present invention for providing timing controlling of a dual clutch transmission to a higher level control method.

More specifically, the method of the present invention is generally indicated at 520 in FIG. 5, and begins at the start entry block 522. Block 524 senses the current output speed of the driven member of the transmission. The current output speed is used as a reference in the method steps as it is relatively stable during the shift event and is an indictor of the effects of the changing engine speed. The method continues at block 526 in which the acceleration of the vehicle is determined. The acceleration may be determined by any of a variety of known methods including but not limited to calculating the value based on the repetitively sensing the output speed and determining its rate of change over time. In this manner, the determined acceleration includes the effects of the current load on the vehicle and the engine.

The method then determines the total time required to perform each possible shift event as generally indicated at 528, which encompass process blocks 532 through 540. It should be appreciated that this determination may be made for all gearshift events within the transmission (e.g. first to second, second to third, fourth to third, etc). However, in the preferred embodiment, the time determinations are only made for the next higher gear and the next lower gear from the presently engaged gear. Likewise, as will be discussed below, the preferred embodiment of the method of the present invention is continuously re-determining the proper timing for a shift to both the next higher gear and the next lower gear without waiting for the higher level control method to first determine what type of shift will occur next. Thus, it should be further appreciated that the method of the present invention may be adapted to just determine the shift timing for the next higher or the next lower shift once the higher level control method has made a determination as to what type of shift is about to happen.

To arrive at the total time required to perform each possible shift event, the time required for separate portions of the shift event must be first determined. First, the time required to perform a clutch changeover to the next higher and next lower gear is determined as generally indicated at 530, which includes process blocks 532 and 534. Specifically, block 532 determines the fill time of the on-coming clutch. Then, block 534 determines the time required to changeover the torque transfer from the off-going clutch to the on-coming clutch for the next higher and next lower gear. It should be appreciated that the clutch fill times typically remain the same and the clutch change over times may be predetermined to follow a particular clutch torque/slip profile (as previously discussed). Thus, the clutch changeover times may be predetermined or known values stored in a lookup table. On the other hand, these times may be actual measured values that are operationally observed and updated over time. Second, decision block 536 then determines if a synchronization has already been performed. If a synchronizer has already been pre-selected and engaged then the "Yes" path to block 538 is followed. If a synchronizer is not presently engaged, the "No" path is followed to block 540 which determines the time required to complete the synchronization of the next higher and next lower gear set. It should be appreciated that in certain applications it may be desirable to predict which synchronizer will be called upon to be engaged in the next shift event and thereby pre-select (i.e. pre-engage) it. The control methodology for synchronizer pre-selection requires predictions to be made as to the possibly of an upcoming shift and to whether the shift will be up or down. It should be further appreciated that this methodology is outside of the scope of this application and is not otherwise discussed herein.

In determining the synchronization times, it should be appreciated that each of the synchronizer engagement times may either be predetermined or known values stored in a lookup table, or actual measured values that are operationally observed and updated over time. More specifically, the method step of determining the time required to complete synchronization may include additional steps to allow the time value to be learned as a historical value that is adaptive over time. For example, if it is desirable to determine the historical synchronization time of each synchronizer engagements, the following additional steps are also included. First, an initially measured value of time required to complete a particular gear synchronization when a gear change is made is initially stored in a database. Then, the value of time required to complete the same synchronization in the transmission is measured the next time the same synchronization is made. The newly measured synchronization time is averaged with the initially stored synchronization time to determine an average synchronization time, which is then is stored in the database in place of the initial value. The averaged synchronization time is continuously re-determined each time the synchronizer is engaged. The latest stored average synchronization time is referenced in the database to identify the value of the synchronization time when the value is required by the higher level method steps thereby providing a gear synchronization time that is historical and adaptive.

Regardless of the manner in which the synchronizer time is determined, the method steps then continue with block 538. Block 538 determines the total time required to complete each possible shift by summing the determined time required to perform a clutch changeover to the next higher and next lower gear (blocks 532 and 534) with the determined time required to complete synchronization of the respective next higher or next lower gear (block 540). Using the determined possible shift event total times (block 538) and the determined acceleration (block 526), block 542 determines an output speed modification value for performing shifts to the next higher and to the next lower gear. Then, block 544 determines the modified shift point output speed (i.e. engine speed) to cause the engine to track the target engine speed profile. The modified shift point output speed is determined by summing the determined output speed modification value (block 538) with the predetermined shift pattern output speed. As previously mentioned, the predetermined shift pattern output speed is retrieved from a stored database or lookup table and is the engine speed at which to complete a shift to achieve optimum performance and fuel economy. Block 544 determines the modified shift point output speed for each possible shift event (to next higher and next lower gear).

The current engine output speed is compared to the determined modified output speed at decision block 546, and when the current engine output speed reaches the determined modified output speed the "Yes" path is taken to process block 548 and a shift is commanded. If the current engine output speed has not yet reached the determined modified output speed, the "No" path is taken back to block 526 to again determine the acceleration and continue the method steps. Thus, there is a continuous re-determining of the output speed modification value and the modified shift point output speed for each possible shift event.

It should be appreciated that the above discussion, which utilized the positive torque upshift situation to describe the determination of target engine speed profile is illustrative and non-limiting in regard to the particular control of the timing of the shift events by the present invention. In the above example, using the positive torque upshift situation, the upshift has been predicted by the higher level control methods with the presumption of an upcoming shift event based on factors not considered by the present invention. In this manner, target engine speed profiles will always be predetermined by the higher level control method under those presumptions. However, it should be noted that, as disclosed above, the method steps of the present invention continuously re-determine optimum shift point output speeds for both the next higher and next lower gear from the currently engaged gear. Thus, the method of the present invention is not limited under the predetermined shift presumptions of the higher level control method. In fact, the method steps of the present invention allow for the timing control of either an upshift or a downshift at any given moment based on its separate determinations of output speed and acceleration regardless of the predeterminations of the higher level control methods. Thus, in the event that conditions cause the higher level control method to spontaneously predetermine a different or opposite shifting situation, the method steps of the present invention have the timing control of that contingency covered.

Therefore, the method of the present invention overcomes the drawbacks and disadvantages of all prior dual clutch transmission shift control methods by providing proper timing of the shift event to allow the engine to track the target engine speed and provide smooth and efficient shifting of the dual clutch transmission. The method of the present invention provides dynamically determined timing control of the shifting events. This improves overall efficiency, drivability, and comfort of the vehicle when compared with prior methods.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

We claim:

1. A method of controlling the timing of the shift events of a dual clutch transmission, said method including the steps of:

sensing the current output speed of the driven member of the transmission;

determining the time required to complete each possible shift event within the transmission;

determining an output speed modification value for each possible shift event;

determining a modified shift point output speed for each possible shift event by summing the determined output speed modification value with a predetermined shift pattern output speed; and commanding the shift when the current output speed reaches the determined modified shift point output speed.

2. A method as set forth in claim 1 wherein the method further includes the steps of:

continuously re-determining an output speed modification value for each possible shift event; and continuously re-determining a modified shift point output speed for each possible shift event by summing the determined output speed modification value with a predetermined shift pattern output speed taken from a stored data base.

3. A method as set forth in claim 1 wherein the method further includes the steps of: determining the acceleration of the vehicle; and determining an output speed modification value for each possible shift event based on the determined acceleration and the determined total time required to complete each possible shift.

4. A method as set forth in claim 1 wherein the step of determining the time required to complete each possible shift event within the transmission further includes the steps of:

determining the time required to perform a clutch changeover to the next higher and next lower gear;

determining if synchronization is needed;

determining the time required to complete the synchronization to the next higher and next lower gear if a synchronizer has not already been selected; and determining the total time required to complete each shift possible in the transmission by summing the determined time required to perform a clutch changeover to the next higher and next lower gear with the determined time required to complete synchronization of the respective next higher or next lower gear.

5. A method as set forth in claim 4 wherein the step of determining the time required to perform a clutch changeover further includes the steps of:

determining the fill time of the on-coming clutch; and determining the time required to changeover the torque transfer from the off-going clutch to the on-coming clutch.

6. A method as set forth in claim 4 wherein the step of determining the time required to complete the synchronization to the next higher and next lower gear further includes the steps of:

measuring the time required to complete a particular gear synchronization when a gear change is made and initially storing the value in a database;

measuring the time required to complete the same synchronization in the transmission is measured the next time the same synchronization is made;

averaging the newly measured synchronization time with the initially stored synchronization time to determine an average synchronization time;

storing the average synchronization time in the database in place of the initial value;

continuously re-determining the averaged synchronization time each time the synchronizer is engaged;

referencing the latest stored average synchronization time in the database to identify the value of the synchronization time when the value is required by the higher level method steps thereby providing a synchronization time that is historical and adaptive.

7. A method of controlling the timing of the shift events of a dual clutch transmission when the transmission is shifting to a higher gear, said method including the steps of:

sensing the current output speed of the driven member of the transmission;

determining the acceleration of the vehicle;

determining the time required to perform a clutch changeover from the current gear to the next higher gear;

determining the time required to complete the synchronization to the next higher gear;

determining the total time required to complete a shift to the next higher gear by summing the determined time required to perform a clutch changeover from current gear to the next higher gear with the determined time required to complete synchronization of next higher gear;

continuously re-determining an output speed modification value based on the determined acceleration and the determined total time required to complete a shift to the next higher gear;

determining the modified shift point output speed by summing the determined output speed modification value with a predetermined shift pattern output speed; and commanding the shift to the next higher gear when the current output speed is greater than or equal to the determined modified shift point output speed.

8. A method as set forth in claim 7 wherein the step of determining the time required to perform a clutch changeover further includes the steps of:

determining the fill time of the on-coming clutch; and determining the time required to changeover the torque transfer from the off-going clutch to the on-coming clutch.

9. A method as set forth in claim 8 wherein the step of determining the fill time includes identifying the known clutch fill times from a stored lookup table.

10. A method as set forth in claim 8 wherein the step of determining the time required to changeover the torque transfer from the off-going clutch to the on-coming clutch includes identifying the known clutch changeover times from a stored lookup table.

11. A method as set forth in claim 7 wherein the step of determining the time required to complete the synchronization of the next higher gear includes identifying the known synchronization time of each of the gears from a stored lookup table.

12. A method as set forth in claim 7 wherein the step of determining the time required to complete the synchronization to the next higher gear further includes the steps of:

measuring the time required to complete a particular gear synchronization when a gear change is made and initially storing the value in a database;

measuring the time required to complete the same synchronization in the transmission is measured the next time the same synchronization is made;

averaging the newly measured synchronization time with the initially stored synchronization time to determine an average synchronization time;

storing the average synchronization time in the database in place of the initial value;

continuously re-determining the averaged synchronization time each time the synchronizer is engaged;

referencing the latest stored average synchronization time in the database to identify the value of the synchronization time when the value is required by the higher level method steps thereby providing a synchronization time that is historical and adaptive.

13. A method as set forth in claim 7 wherein the step of determining a modified shift point output at which to command the shift to the next higher gear includes retrieving the predetermined shift pattern output speed from a lookup table.

14. A method of controlling the timing of the shift events of a dual clutch transmission when the transmission is shifting to a lower gear, said method including the steps of:

sensing the current output speed of the driven member of the transmission;

determining the acceleration of the vehicle;

determining the time required to perform a clutch changeover from the current gear to the next lower gear;

determining the time required to complete the synchronization of the next lower gear;

determining the total time required to complete a shift to the next lower gear by summing the time required to perform a clutch changeover from the current gear to the next lower gear with the time required to complete synchronization of the next lower gear;

continuously re-determining an output speed modification value based on the determined acceleration and the total time required to complete a shift to the next lower gear;

determining the modified shift point output speed by summing the determined output speed modification value with a predetermined shift pattern output speed; and commanding the shift to the next lower gear when the current output speed is less than the determined modified shift point output speed.

15. A method as set forth in claim 14 wherein determining the time required to perform a clutch changeover further includes the steps of:

determining the fill time of the on-coming clutch; and determining the time required to changeover the torque transfer from the off-going clutch to the on-coming clutch.

16. A method as set forth in claim 15 wherein the step of determining the fill time includes identifying the known clutch fill times from a stored lookup table.

17. A method as set forth in claim 15 wherein the step of determining the time required to changeover the torque transfer from the off-going clutch to the on-coming clutch includes identifying the known clutch changeover times from a stored lookup table.

18. A method as set forth in claim 14 wherein the step of determining the time required to complete the synchronization of the next lower gear to its input shaft includes identifying the known synchronization time of each of the gears to its input shaft from a stored lookup table.

19. A method as set forth in claim 14 wherein the step of determining the time required to complete the synchronization to the next lower gear further includes the steps of:

measuring the time required to complete a particular gear synchronization when a gear change is made and initially storing the value in a database;

measuring the time required to complete the same synchronization in the transmission is measured the next time the same synchronization is made;

averaging the newly measured synchronization time with the initially stored synchronization time to determine an average synchronization time;

storing the average synchronization time in the database in place of the initial value;

continuously re-determining the averaged synchronization time each time the synchronizer is engaged;

referencing the latest stored average synchronization time in the database to identify the value of the synchronization time when the value is required by the higher level method steps thereby providing a synchronization time that is historical and adaptive.

20. A method as set forth in claim 14 wherein the step of determining a modified shift point output at which to command the shift to the next lower gear includes retrieving the predetermined shift pattern output speed from a lookup table.

* * * * *